United States Patent [19]

Palmer et al.

[11] 3,856,512
[45] Dec. 24, 1974

[54] PROCESSING TITANIFEROUS IRON ORES FOR THE RECOVERY OF ALUMINUM, CHROMIUM, IRON, TITANIUM AND VANADIUM

[75] Inventors: Joseph Palmer, Les Saules, Quebec; Guy Handfield, Loretteville, Quebec, both of Canada

[73] Assignee: Centre de Recherche Industrielle du Quebec, Canada

[22] Filed: Apr. 27, 1973

[21] Appl. No.: 355,303

[52] U.S. Cl. .................. 75/101 R, 75/97 R, 75/1, 75/1 TI, 75/33, 75/34, 423/61, 423/68, 423/119, 423/138, 423/150, 423/84, 423/69
[51] Int. Cl. .................................................. C22b 3/00
[58] Field of Search ........... 423/83, 84, 150, 61, 68, 423/119, 138, 69; 75/101 R, 1, 1 TI, 97 R

[56] References Cited
UNITED STATES PATENTS

| | | |
|---|---|---|
| 1,618,795 | 2/1927 | Bachman .............................. 423/83 |
| 1,911,396 | 5/1933 | Saklatwalla et al. ................ 423/83 X |
| 1,932,087 | 10/1933 | Richter ............................. 423/84 X |
| 2,187,750 | 1/1940 | Marvin .............................. 75/101 R |
| 2,809,105 | 10/1957 | Mancke et al. ........................... 75/1 |
| 3,323,900 | 6/1967 | Takahashi et al. .................... 71/1 X |
| 3,428,427 | 2/1969 | Raceini ............................... 71/1 TI |

*Primary Examiner*—Herbert T. Carter
*Attorney, Agent, or Firm*—Cushman, Darby & Cushman

[57] ABSTRACT

An improved process is provided for to separate iron from titaniferous iron ores by roasting the latter in the presence of a roasting agent made up of a mixture of sodium oxide producing compound and calcium or magnesium oxides or a calcium oxide or magnesium oxide producing compound whereby chromium, vanadium and aluminum oxides can be readily leached out from the ore.

12 Claims, No Drawings

PROCESSING TITANIFEROUS IRON ORES FOR THE RECOVERY OF ALUMINUM, CHROMIUM, IRON, TITANIUM AND VANADIUM

The present invention relates to a process for treating titaniferous iron ores and concentrates made from the afore mentioned ores. After the treatment, the ores can be used directly as feed material for steel making. Or alternatively, the treated ore can be prereduced and separated magnetically or by any other suitable method, to produce a refined concentrate that can be processed into steel and high titanium bearing slag.

PRIOR ART

It is known that some deposits of titaniferous ores contain high amounts of titanium and are referred to as ilmenites and these are used to produce titanium dioxide in pigment-useful state. It is also known that other deposits of titaniferous ores such as titaniferous magnetites contain relatively high amount of iron and thus would normally be considered as a good source of iron for the making of steels. These ores are usually referred to as titaniferous iron ores. They contain impurities such as the oxides of titanium, chromium and vanadium, and therefore they are not normally used in steel making. It is therefore desirable to provide a process whereby most of the undesirable impurities together with the gangue material can be separated thereby rendering the ore suitable for the production of steel and high titania slag. When used herein, the term "titaniferous iron ore" is intended to include those ores which contain minor amounts of oxides such as those of chromium, vanadium and which have an iron content of over 40% and a titanium content of less than 25%.

As can be appreciated by those skilled in the art, many processes can efficiently separate titanium dioxide from ilmenite ores, but they cannot be efficiently used with titaniferous iron ores. However, these ores can now be treated with the process described in this invention. Furthermore the process requires simple, conventional process equipments that are readily available on the market.

THE INVENTION

In accordance with the present invention a novel process allows the treatment of titaniferous iron ores whereby iron may be separated from the chromium, aluminium, vanadium and others, the latter being recovered and separated for their high commercial values. Therefore, the process of the present invention is such as to allow the production of an iron concentrate suitable for use in the iron and steel industry while allowing for the recovery of the valuable impurities.

Broadly, the process first involves roasting finely divided titaniferous iron ores or concentrates in an oxidizing atmosphere and in the presence of a roasting agent made of a mixture of a sodium oxide producing compound and calcium or magnesium oxides or a calcium or magnesium oxide producing compound whereby valuable oxides such as those of chromium, vanadium and aluminium are converted into soluble salts that can be leached out from the ore.

The roast obtained in the roasting step is leached with a alkaline solution in order to solubilise the valuable salts such as those of chromium, vanadium and aluminium, which may be recovered later from the alkaline solution, leaving behind the solid residue containing mainly iron oxide, calcium and magnesium aluminates, silicates and some calcium titanate.

The leached residue is then reduced. The iron oxide content of the residue is converted to metallic iron while the other components are only slightly affected by the reduction. After grinding the reduced mass, metallic iron can be separated by magnetic separator or other well known separation apparatuses. The magnetic concentrate so obtained is then melted whereby the pure iron can be recovered and used for steel making while the residual slag which has a high titanium content is suitable for producing titanium dioxide pigments.

The titaniferous iron ores or concentrates which may be treated in accordance with the present invention are those wherein the iron content is at least 40% and the titanium dioxide content is not more than 25%. As an example of the titaniferous iron ores which may be treated in accordance with the present invention there may be mentioned some titaniferous magnetites found in the Province of Quebec, which analyze as follows:

|  | Ore "A" | Ore "B" | Ore "C" |
|---|---|---|---|
| Fe Total* | 49.0 | 54.0 | 60.0 |
| $TiO_2$ | 11.9 | 19.15 | 13.0 |
| $Al_2O_3$ | 10.0 | 6.55 | 6.2 |
| $Cr_2O_3$ | 1.6 | 0.51 | 0.2 |
| $V_2O_5$ | 0.42 | 0.57 | 1.1 |
| $SiO_2$ | 2.2 | 0.63 | 2.3 |
| MgO | 6.02 | 3.17 | 0.9 |
| CaO | 0.18 | 0.27 | 0.4 |

*various iron oxides expressed as total iron.

PROCESS DESCRIPTION

The titaniferous iron ore is ground to a mesh size of from 60 to 200 mesh in a conventional grinder.

The ground titaniferous iron ore is then prepared for the roasting step by mixing with a roasting agent made up of a sodium-oxide forming compound and calcium or magnesium oxide or a calcium or magnesium-oxide forming compound or a mixture of calcium oxide and magnesium oxide. As sodium-oxide forming compounds there may be mentioned those compounds which under high temperatures will decompose to sodium oxide such as sodium carbonate, sodium bicarbonate, sodium hydroxide or mixtures thereof. As calcium or magnesium-oxide forming compound there may be mentioned those compounds which under high temperatures will decompose to calcium or magnesium oxide, such as calcium carbonate or calcium hydroxide or mixtures thereof or magnesium carbonate or magnesium hydroxide or mixtures thereof. As an example of a mixture of calcium-oxide and magnesium-oxide forming compound there may be mentioned dolomites which are mixtures of calcium and magnesium carbonates.

The amount of sodium oxide or sodium-oxide forming compound used in accordance with the present invention is in relation to the initial content of chromium oxide, vanadium oxide and aluminium oxide in the titaniferous iron ore. It can be used in stoichiometric amounts, but an excess to stoichiometric amount of 5 to 50% is preferred. The stoichiometric amount is calculated as follows:

$Na_2O$(moles) = 2 × $Cr_2O_3$(moles) + 3 × $V_2O_5$(moles) + $Al_2O_3$(moles)

The amount of calcium oxide or magnesium-oxide forming compound used in accordance with the present invention is in relation to the initial content of silicon dioxide and titanium dioxide in the titaniferous iron ore. It is used in stoichiometric amounts but for better recuperation an excess of 5 to 30% of the stoichiometric amount is preferred. The stoichiometric amount is calculated as follows:

CaO or MgO(moles) =
2 × $SiO_2$(moles) + $TiO_2$(moles) − (CaO + MgO) (moles present in the ore).

In order to prepare for the roasting step, it is preferred to blend the ground titaniferous iron ore with the wet roasting agent acting as binder, in order to form pellets, briquets or flakes. The pellets or briquets are formed in a suitable pelletizing or briquetting apparatus to provide pellets or briquets having volume of approximately 1 $cm^3$.

The pellets, briquets or flakes are then charged in an open container wherein air circulation is favored to provide an oxidizing atmosphere. If desired, oxygen may be provided to enhance the oxidizing cycle. The roasting of the pellets, briquets or flakes is carried out at a temperature from 800° to 1,300°C. for a period of from ½ to 3 hours.

The roast obtained is a porous mass, the porosity of which is increased with the increased amount of calcium or magnesium oxide used. The roast is ground before leaching.

The ground roast is then leached with an aqueous solution of sodium carbonate containing small amount of sodium hydroxide. The composition of solution is being governed by the amount of the three calcium aluminates, $12CaO.7Al_2O_3$, $3CaO.Al_2O_3$, $4CaO.Al_2O_3.Fe_2O_3$, calcium chromate $CaCrO_4$, and calcium vanadate $Ca_3(VO_4)_2$ formed during roasting. It is known that the higher the roasting temperature the more of the above compounds are likely to be formed.

A leaching solution containing 5 to 75 gr/l $Na_2CO_3$ and 2 to 10 gr/l NaOH is found to be satisfactory for leaching a roast containing 2 – 12% aluminium oxide roasted at 900° – 1,200°C. The amount of leaching solution added to the roast is in a liquid solid ratio of about 3:1.

Filtration is carried out on a suitable apparatus such as a conventional vacuum filter. In order to recover further amounts of soluble salts, the filter cake is washed with hot water (40°–70°C) and the filtrates are combined.

The combined filtrates containing a mixture of soluble sodium chromate, aluminate and vanadate are set aside for further processing to recover the chromium, aluminium and vanadium in the form of sodium salts and oxides in accordance with processes well known in the art.

After drying, the solid residue is then heated under reducing conditions to reduce the iron oxide to a lower state of oxidation thereby allowing the metallic iron and soome of the oxides formed to be recovered by magnetic separation. This reduction is carried out in the presence of a reducing agent such as hydrogen, carbon monoxide or a mixture thereof or a carbonaceous compound suitable as a reducing material such as coal, coke or oil. The amount of reducing agent is preferably in excess of the stoichiometric amount required to convert the iron oxides to metallic iron. Depending on the reducing agent used, the temperature will vary from 700° – 1,300°C. For example when using hydrogen the temperature will be above 700°C, when using carbon monoxide the temperature will be above 900°C, and when using coal or coke the temperature will be above 1,000°C. The reduction is carried out for a period of 30 minutes to 4 hours.

The reduced material so obtained is then ground to a particle size of about 325 mesh and subsequently passed through a magnetic separator to recover a magnetic concentrate of metallic iron and the non-magnetic tailings, containing mainly aluminates and silicates of calcium and magnesium and also a small amount of calcium titanate, are rejected. On the other hand the magnetic portion upon melting and separation from the titania slag formed is suitable for use in steel making whereas the titania slag can be used for producing titanium dioxide pigments.

The process of the present invention will be more fully understood by referring to the following examples which are given to illustrate the invention rather than limit its scope.

EXAMPLE 1

The starting titaniferous ore is called "ore A" and is found in the Province of Quebec, Canada and analyzed as follows:

| ELEMENTS | WT % | GRAM-MOLE/100 gr |
|---|---|---|
| Fe Total | 49.0 | 0.878 |
| $TiO_2$ | 11.9 | 0.1487 |
| $Al_2O_3$ | 10.0 | 0.098 |
| $Cr_2O_3$ | 1.60 | 0.0105 |
| $V_2O_5$ | 0.42 | 0.00231 |
| $SiO_2$ | 2.2 | 0.0366 |
| MgO | 6.02 | 0.1494 |
| CaO | 0.18 | 0.00321 |

1. PREPARATION OF THE INITIAL CHARGE

The ore (100gr) was ground to 100% — 200 mesh in a conventional pulveriser. Any technical grade of sodium carbonate and calcium carbonate is suitable for roasting but for this experiment reagent grade quality was used and no grinding was necessary. For plant application any crusher or grinding mill available on the market can be utilised. This material was then blended with the required amount of reagents, i.e., $Na_2O$ and CaO yielding materials. The quantities of reagents required were established a follows.

The ore was ground in a conventional pulveriser until 100% of −200 mesh size was obtained. In order to permit maximum contact between water-soluble $Na_2CO_3$ and the ore the following procedure was used for blending. In a separate container 15.0 gr of $Na_2CO_3$ and 7.7 gr of $CaCO_3$ were blended after which the dry blend was transferred to a flat pan containing 30cc of water and 100 gr of the pulverised ore and the ingredients were mixed until a slurry was obtained. The pan containing the slurry was placed in an oven heated to 125°C. for 6 hours and when all the water was evaporated a hard solid mixture of the ore and roasting agent was obtained. The solid mass was removed and crushed to small flakes with a volume of about 1 $cm^3$.

The amounts of the roasting agents were calculated as follows:

$Na_2O$(moles)
= 2 × $Cr_2O_3$(moles) + 3 × $v_2O_5$(moles) + $Al_2O_3$(moles)

= 2 × 0.011 + 3 × 0.00231 + 0.098
= 0.128 gr-moles

Using 10% excess
  0.128 × 1.1 = 0.141 gr-moles
  = 0.141 × 106 ($Na_2CO_3$)
  = 15 gr $Na_2CO_3$ CaO(moles)
  = 2 × $SiO_2$(moles) + $TiO_2$(moles) − MgO + CaO) moles
  = 2 × 0.0366 + 0.1487 − (0.1494 + 0.00321)
  = 0.0693 gr-moles Using 10% excess
  0.0693 × 1.1 = 0.0714 gr-moles
  = 0.0714 × 100.1 ($CaCO_3$)
  = 7.63 gr $CaCO_3$

2. ROASTING OF THE CHARGE a. Equipment

The roasting pot was made of 6 inches ID cast iron pipe cap into which a 6 inches diameter perforated plate was placed at half way of its height. One ½ inch pipe was inserted through the center of the perforated plate and screwed into the bottom of the pipe cap. Between the perforated plate and the bottom of the pipe cap portion of the ½ inch pipe, four ¼ inch holes were drilled around the circumference for the supply of air.

The roasting pot was placed in a muffle furnace, and through the 1 inch vent line of the furnace, the crucible was piped to a compressed air cylinder. Rotary kilns, shaft furnaces, heart furnaces can be successfully employed for roasting.

b. Roasting Process

The roasting pot containing the ore and the roasting agent was installed into a cold furnace. The power was then switched on and the furnace was allowed to reach 800°C in about one hour. At this temperature, 50cc of air per minute were continuously supplied under the perforated plate through the roasting pot. After the preset temperature (1,150°C) was reached, the furnace temperature was kept constant for two hours. Following this, the air and power supplies were cut off and the roasting pot allowed to cool in the furnace, thereby yielding 110 gr of a porous dark brown mass which was then ground in a conventional pulveriser to −100 mesh.

3. LEACHING OF ROASTED MATERIAL

To 110gr of pulverised roast material were added 300 ml of a leaching solution made of 40gr of $Na_2CO_3$ and 10gr NaOH dissolved in one liter of water. This mixture was continuously agitated and its temperature kept at 70° to 80°C for 4 hours.

Filtration was carried out on a conventional vacuum filter and the filter cake was washed several times with hot water (40°–70°C) to yield optimum recovery of soluble salts from the ore.

The filtrate containing a mixture of sodium chromate, aluminate and vanadate was collected for further processing to recover the chromium, aluminium and vanadium in the form of sodium salts and oxides in accordance with processes known in the art.

The products of the leaching phase of the roasted material are a pregnant solution and a solid residue which may be further processed.

4. PROCESSING OF THE PREGNANT SOLUTION

The pregnant solution carries most of the valuable salts of chromium, vanadium, aluminium as well as those of sodium. These valuable salts can be recovered from the solution through conventional techniques well established in the art. Similarly, sodium salts can be recovered from the solution to be recirculated into the process of this invention.

5. PROCESSING IN THE SOLID RESIDUE

The solid residue is heated under reducing conditions to reduce the iron oxide to a lower state of oxidation thereby allowing the metallic iron and some of the oxides formed to be separated from the non-magnetic gangue magerial. The reduction is carried out in the presence of a carbonaceous material.

For the reduction, a horizontal tube furnace was used. 50 gr of material was mixed with 12.5 gr graphite powder and placed in an aluminum oxide boat. The furnace was gradually heated to 1,200°C and kept at this temperature for 2 hours. After that, the power was cut off and the furnace allowed to cool. When the temperature of the furnace reached 150°C, the aluminium oxide boat with the reduced material was removed from the furnace. Rotary kilns, shaft furnaces, fluidized beds are some of the industrial equipments which could be employed for the reduction.

The reduced material was then ground to minus 325 mesh in a conventional pulveriser and then separated magnetically (Davis Tube). Any separating machine based on magnetic property, specific gravity difference, wetting properties or others, can be successfully employed for this separation.

ANALYSIS OF REDUCED ORE CONCENTRATE

| | | |
|---|---|---|
| % | Fe (metallic) | 74 |
| % | Fe total | 75 |
| % | $SiO_2$ | 0.96 |
| % | $TiO_2$ | 12.0 |
| % | $Al_2O_3$ | 3.31 |
| % | $Cr_2O_3$ | 0.89 |
| % | $V_2O_5$ | N.D.* |
| % | MgO | 4.2 |
| % | CaO | 2.29 |
| % | $Na_2O$ | 0.18 |
| | | 98.83 |

*N.D.: Non Detectable.

EXAMPLE 2

The starting titaniferous ore, called ore "B" is found in the Province of Quebec, Canada and analyzed as follows:

| ELEMENTS | WT % | GRAM-MOLES/100 gr |
|---|---|---|
| Fe total | 54.0 | 0.968 |
| $TiO_2$ | 19.15 | 0.240 |
| $Al_2O_3$ | 6.55 | 0.0642 |
| $Cr_2O_3$ | 0.51 | 0.00336 |
| $V_2O_5$ | 0.57 | 0.00313 |
| $SiO_2$ | 0.63 | 0.0105 |
| MgO | 3.17 | 0.0787 |
| CaO | 0.27 | 0.00481 |

The reagents and the grinding technique used were as in example 1. The quantities of reagents making up the roasting agent were calculated as follows:

$Na_2O$(moles)
  = 2 × $Cr_2O_3$(moles) + 3 × $V_2O_5$(moles) + $Al_2O_3$(moles)
  = 2 × 0.00336 + 3 × 0.00313 + 0.0642
  = 0.0803 gr-moles Using 10% excess
  0.0803 × 1.1 = 0.0883 gr-moles $0.0883 \times 106 = 9.36$ gr $Na_2CO_3$ CaO(moles)
$= 2 \times SiO_2(moles) + TiO_2(moles) - (MgO + CaO)$ moles
$= 2 \times 0.0105 + 0.240 - (0.0787 + 0.00481)$
$= 0.1775$ gr-moles Using 10% excess
$0.1775 \times 1.1 = 0.1952$ gr-moles
$= 0.1952$ gr-moles $\times 100$ ($CaCo_3$)
$= 19.5$ gr $CaCO_3$ To 100 gr or ore, 9.36 gr of $Na_2CO_3$ and 19.5 gr of $CaCO_3$ were added. The blending, roasting, leaching, reduction and magnetic separation steps were carried out as in Example 1 to yield on iron ore concentrate analyzing as follows:

ANALYSIS OF REDUCED ORE CONCENTRATE

| | | |
|---|---|---|
| % | Fe (metallic) | 74 |
| % | Fe total | 76 |
| % | $SiO_2$ | 0.66 |
| % | $TiO_2$ | 17.3 |
| % | $Al_2O_3$ | 1.51 |
| % | $Cr_2O_3$ | 0.47 |
| % | $V_2O_5$ | N.D.* |
| % | MgO | 2.29 |
| % | CaO | 2.00 |
| % | $Na_2O$ | 0.05 |
| | Total | 100.28 |

*N.D.: Non Detectable.

EXAMPLE 3

The starting material, identified as ore "C" is found in the Province of Quebec. This ore analyzed as follows:

| ELEMENTS | WT % | GRAM-MOLE/100 GR |
|---|---|---|
| Fe | 60 | 1.0743 |
| $TiO_2$ | 13.0 | 0.1627 |
| $Al_2O_2$ | 6.2 | 0.0608 |
| $Cr_2O_3$ | 0.2 | 0.0013 |
| $V_2O_5$ | 1.1 | 0.0060 |
| $SiO_2$ | 2.3 | 0.0383 |
| MgO | 0.9 | 0.0223 |
| CaO | 0.4 | 0.0071 |

The roasting step and the grinding techniques used were the same as in example I except that a mixture of sodium carbonate and magnesium carbonate was used as the roasting agent. The amounts of reagents making up the roasting agent were calculated as follows:

$Na_2O$(moles)
$= 2 \times Cr_2O_3(moles) + 3 \times V_2O_5(moles) + Al_2O_3(moles)$
$= 2 \times 0.0013 + 3 \times 0.0060 + 0.0608\ Al_2O_3$
$= 0.0814$ moles Using 10% excess
$0.0814 \times 1.1 = 0.0895$
$0.0895 \times 106 = 9.49$ gr $Na_2CO_3$ MgO(moles)
$= 2 \times SiO_2(moles) + TiO_2(moles) - (MgO + CaO)$ moles
$= 2 \times 0.0383 + 0.1627 - (0.0223 + 0.0071)$
$= 0.2099$ gr-moles Using 10% excess
$0.2099 \times 1.1 = 0.2309$ moles
$0.2309$ gr-mole $\times 84.32 (MgCO_3)$
$= 19.46$ gr $MgCO_3$ To 100 gr ore, 9.49 gr of $Na_2CO_3$ and 19.46 gr of $MgCO_3$ were added. The blending, roasting, leaching, reduction and magnetic separation steps were carried out as in example I to yield a reduced iron ore concentrate having a metallic iron content greater than that reported in example 2.

The embodiment of the invention in which an exclusive property, or privilege is claimed are defined as follows:

1. A process for treating titaniferous iron ore or concentrate having a total iron content of at least 40% and a titanium dioxide content of less than 25% which comprises a. roasting the finely divided titaniferous iron ore or concentrate in an oxidizing atmosphere and in the presence of a roasting agent made up of a mixture of (1) a sodium oxide forming compound and (2) an alkaline earth metal oxide compound selected from calcium oxide, magnesium oxide, a calcium oxide forming compound, a magnesium oxide forming compound and mixtures thereof, the amount of sodium oxide or sodium oxide forming compound being at least the stoichiometric amount expressed as sodium oxide and calculated in accordance with the formula:

$Na_2O$(moles)
    $= 2 \times Cr_2O_3(moles) + 3 \times V_2O_5(moles) + Al_2O_3(moles)$ and the amount of the second oxide forming compound of the roasting agent being at least the stoichiometric amount expressed as calcium oxide or magnesium oxide calculated in accordance with the formula:

CaO or MgO(moles)
    $= 2 \times SiO_2(moles) + TiO_2(moles) - (CaO + MgO)$ (moles in the ore or concentrate)

b. leaching the roast with an aqueous solution of 5 to 75 gr/l of sodium carbonate and 2 to 10 gr/l of sodium hydroxide;

c. and separating the solid containing the residue from the chromate, aluminate and vanadate containing solution.

2. A process according to claim 1 including the further steps of reducing the solid residue obtained to reduce the iron oxide to metallic iron and recovering said metallic iron.

3. A process according to claim 2 wherein the roasting is carried out at 800° to 1,300°C, and the reducing is carried out using as a reducing agent hydrogen, carbon monoxide, coal, coke or oil.

4. The process of claim 2 wherein the titaniferous iron ore is titaniferous magnetite.

5. The process of claim 4 wherein the roasting is carried out in the presence of a mixture of sodium oxide and calcium oxide.

6. A process according to claim 3 wherein the reducing is carried out at 700° to 1,300°C.

7. A process according to claim 1 wherein the roasting is carried out at 800° to 1,300°C.

8. A process according to claim 7 wherein per 100 grams of ore there are employed 9.36 to 15 grams of sodium carbonate and 7.7 to 19.5 grams of calcium carbonate or magnesium carbonate.

9. A process according to claim 7 wherein the amount of (1) is 5 to 50% over the stoichiometric amount and the amount of (2) is 5 to 30% over the stoichiometric amount.

10. In a process for treating titaniferous iron ore or concentrate having a total iron content of at least 40% and a titanium dioxide content of less than 25% by roasting said ore or concentrate, leaching the roast, reducing the solid residue obtained in the leach and recovering a metallic iron concentrate, the improvement which comprises carrying out the roasting step of the finely divided titaniferous iron ore in an oxidizing atmosphere and in the presence of a roasting agent made up of (1) a sodium oxide forming compound and (2) an alkaline earth oxide compound selected from calcium oxide, magnesium oxide, a calcium oxide forming compound, a magnesium oxide forming compound and mixtures thereof, the amount of sodium oxide forming compound being at least the stoichiometric amount expressed as sodium oxide calculated in accordance with the formula:

$Na_2O$(moles)
$= 2 \times Cr_2O_3$(moles) $+ 3 \times V_2O_5$(moles) $+ Al_2O_3$(moles)

and the amount of the second oxide forming compound of the roasting agent being at least the stoichiometric amount expressed as calcium oxide or magnesium oxide calculated in accordance with the formula:

CaO or MgO(moles)
$= 2 \times SiO_2$(moles) $+ TiO_2$(moles) $- (CaO + MgO)$ (moles present in ore or concentrate).

11. A process according to claim 10 wherein the roasting is carried out at 800° to 1,300°C for ½ to 3 hours.

12. A process according to claim 11 wherein the amount of (1) is 5 to 50% over the stoichiometric amount and the amount of (2) is 5 to 30% over the stoichiometric amount.

* * * * *